Porter & Norton.
Wheel Plow.
No 79,917. Patented Jul. 14, 1868.

Witnesses:
S. C. Kenow
G. A. Pettit

Inventors:
Porter and Norton
By Munn & Co
Attorneys

United States Patent Office.

JOHN F. PORTER AND ALONZO NORTON, OF TIDIOUTE, PENNSYLVANIA.

Letters Patent No. 79,917, dated July 14, 1868.

IMPROVEMENT IN GANG-PLOW.

The Schedule referred to in these Letters Patent and making part of the same.

TO ALL WHOM IT MAY CONCERN:

Be it known that we, JOHN F. PORTER and ALONZO NORTON, of Tidioute, in the county of Warren, and State of Pennsylvania, have invented a new and improved Gang-Plow; and we do hereby declare that the following is a full, clear, and exact description of the construction and operation of the same, reference being had to the accompanying drawings, making a part of this specification, in which—

In this improved gang-plow, each plow has a hinged coulter, which severs the weeds, roots, &c., and by which the plow is drawn forward. The heel of each plow is hinged to its standards, and a new supporting-frame, and new means of attaching and adjusting the plows upon it, are employed; by means of all which improvements, a lighter, neater, stronger, and more completely adjustable gang-plow is produced than has ever heretofore been brought into use.

Figure 1:
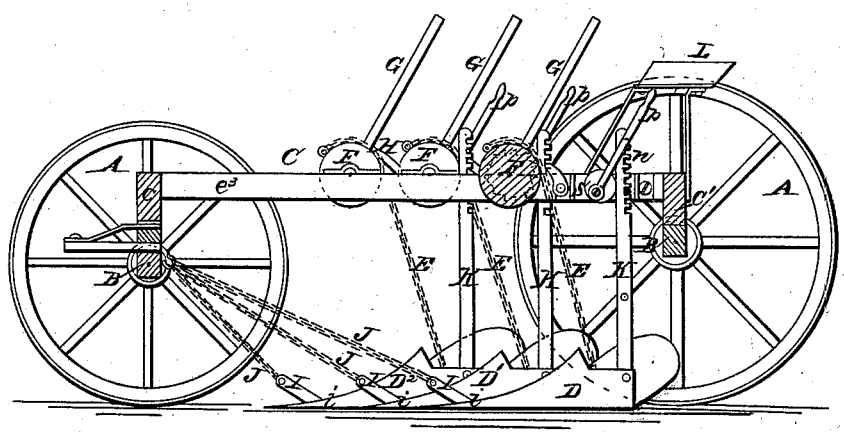
Figure 1 is a longitudinal vertical section through line $x\ x$ of fig. 2.
Figure 2:
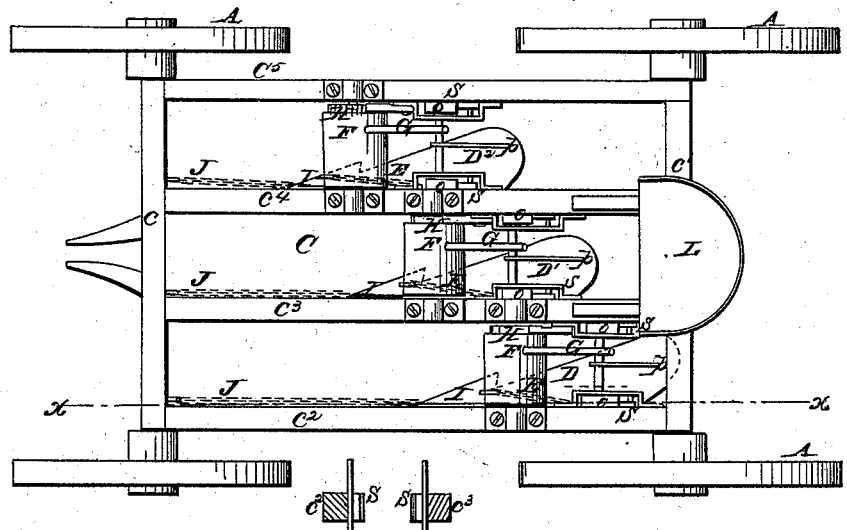
Figure 2 is a plan.

In the drawings, A A are the wheels, B B the axles, and C the supporting-frame, the latter being constructed of two rockers or bolsters, $c\ c^1$, resting on the axles, and four or more longitudinal sleepers or beams, $c^2\ c^3\ c^4\ c^5$, united by mortise and tenon to the rockers at equal distances apart, as seen in fig. 2.

D $D^1$ $D^2$ are the plows, each one having a chain, E, attached to it, which passes up over a roller or windlass, F, in order to afford the means for readily raising and lowering the plows.

The windlasses are provided with levers G G, and ratchet and pawl H.

Each plow is also provided with a sharp-edged coulter, I, hinged at $i$ to the plow just behind the point, and at its upper end having a draught-chain, J, attached to it, which extends to the forward axle, and is fastened there in any convenient manner that will admit of its being readily adjusted in length. The draught of the plow comes upon this chain. By shortening or lengthening the chain, the pitch of the plow may be adjusted and controlled, as described.

The coulter is made to rake forward, forming a sharp-cutting angular edge with the plow-point, in which angle sticks, weeds, &c., will be severed with the outlay of but little power.

Figure 3:
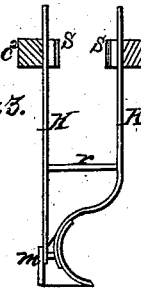
Figure 3 is a detached rear elevation of one of the plows, with its supporting-standards.

The heel of the plow is supported by two standards, K K', to the lower end of which it is hinged, as seen at $m$, in fig. 3.

The standards are connected by a round, $r$, and pass up through a socket or slot, S, in or attached to the beams $c^2\ c^3\ c^4\ c^5$. One side or edge of the standards, at their upper end, is formed into a rack, $n$, which engages with a pin or tooth in the socket, when the rack is pressed against such pin, and thereby holds the standard in place, and retains the heel of the plow at any desired elevation.

A cam or eccentric-wheel, $o$, just behind the rack, in the socket, and provided with a lever, $p$, serves to press the standard against the pin when required.

The levers $p\ p\ p$ are all within easy reach of the driver's foot, as he sits in the seat L, and, by pressing upon them with his foot, he can hold the plows in place, with their heel at any elevation, giving them any required pitch, or he can drop them, and allow the plow to rest with its whole weight upon or in the ground. This construction not only renders the plow light, simple, and inexpensive, but by bringing the draught on the forward part of the plow, it renders the latter stronger, and, by supporting the plow on the hinged standards and coulter, it enables it to be adjusted at any required pitch, so that, if desired, only its point and sides shall come in contact with the soil, thereby avoiding the friction that results from the plow's resting with its whole weight upon the ground.

The weight of the plow, and of the soil which it turns up, is supported by the frame C and the wheels A A.

It will be observed that the wheels, axles, and frame C compose an ordinary wagon. When the plows are not in use, they, with their connected gear, may be removed, and the rest of the apparatus employed as a common farm-wagon. A farmer having a common wagon, need not procure an additional set of wheels, axles, and supporting-frame C for his gang-plow, if he uses our invention; he need only attach his plow-gear to his old wagon, thus saving the greater part of the cost of the apparatus.

Having thus described our invention, what we claim as new, and desire to secure by Letters Patent, is—

1. The hinged coulter I, attached to the plow, and operating as described.

2. A plow, so constructed and operating that the draught is mainly or wholly upon the point, as herein set forth.

3. The combination of the hinged standards K K' with the plow D, substantially as described.

4. The combination of the rack $n$, socket S, cam $o$, lever $p$, standard K, and plow D, substantially as described, and for the purpose set forth.

The above specification of our invention signed by us, this 9th day of May, 1868.

JOHN F. PORTER,
ALONZO NORTON.

Witnesses:
   Rob't C. Beach,
   Ed. A. Stevens.

Witnesses:
   Chas. A. Pettit,
   Solon C. Kemon.